United States Patent Office 3,282,327
Patented Nov. 1, 1966

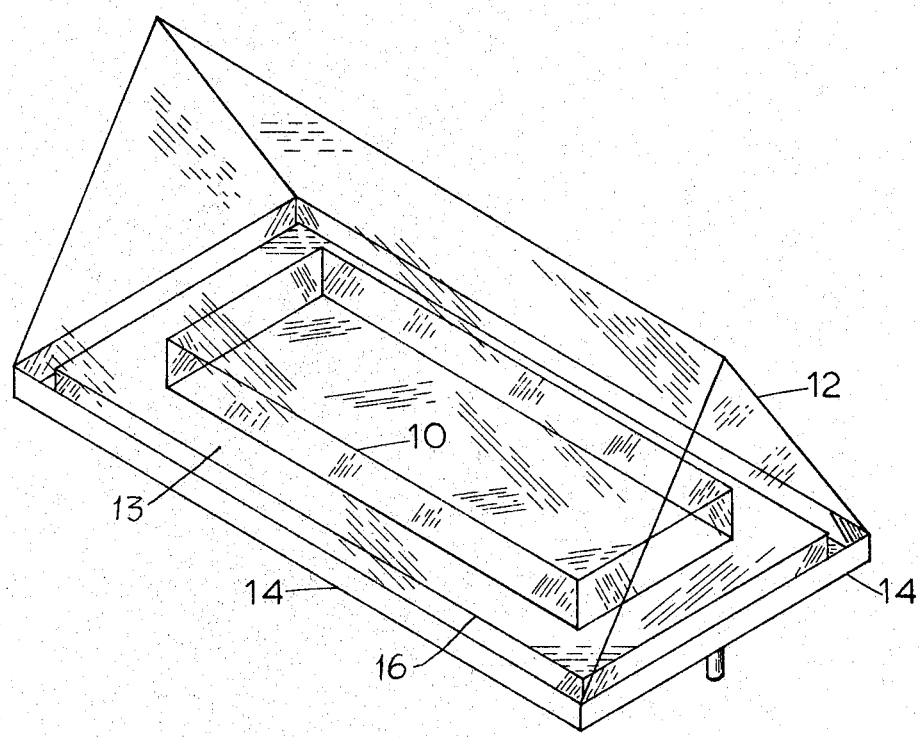

3,282,327
SOLAR EVAPORATION WITH FLOATING
POLYMERIC-CARBONACEOUS MATERIAL
John F. Hardy, Andover, Merrill E. Jordan, Walpole, and
Avrom I. Medalia, Newton, Mass., assignors to Cabot
Corporation, Boston, Mass., a corporation of Delaware
Filed Apr. 8, 1965, Ser. No. 446,673
15 Claims. (Cl. 159—47)

The present invention relates generally to processes for the evaporation of water and more specifically to a novel improved process for evaporating water by radiant energy.

Since the beginning of time Man has considered his sources of fresh water as a most valuable possession. It is a sociological and historical fact that where there exists an abundance of fresh water there exists a fundamental requisite for industrial, agricultural and population growth. From about the time of the industrial revolution it has become increasingly important, due primarily to the continuously expanding needs of industry and mankind, that new sources of fresh water be found. One of the potentially more attractive sources of fresh water resides in the oceans and seas of the world. However in order to produce fresh water from saline water, saline water must be treated by processes such as evaporation and distillation which heretofore have been prohibitively expensive and/or slow. One of the processes which has been particularly theoretically attractive comprises evaporating sea water utilizing solar radiant energy and thereafter condensing the evaporated water by any suitable manner. Said process of course occurs naturally during evaporation from the surface of the seas, the energy for said evaporation being supplied by solar radiation. However, the rate of evaporation in said natural phenomenon is normally entirely too slow to be of practical value.

On a smaller scale, the problem of economic evaporation of saline water by means of solar radiant energy has been a persistent problem to the magnesium metal producing industry. Magnesium, in the form of chloride salts is generally present in sea water to the extent of between about 1200 and 1300 p.p.m. However, in order to extract the magnesium salt content from sea water, the concentration of magnesium salts is preferably increased prior to extraction, such as by distillation or evaporation of a portion of said water. Many attempts have been made to accomplish the concentration of sea water by evaporation thereof with solar radiant energy. However, said attempts have generally met with failure because the size of the system or apparatus required to provide a sufficient rate of evaporation from a given volume of water has been excessively large. With the advent of the present invention, however, the rate at which water can be evaporated from the surface of aqueous solutions by heating with radiant energy has been vastly increased.

It is a principal object of the present invention to provide an improved process for the evaporation of water by radiant energy.

It is another object of the present invention to provide an improved process for the evaporation of water by solar energy.

It is another object of the present invention to provide a process for markedly increasing the rate of concentration due to solar radiant energy of aqueous solutions comprising dissolved salts.

It is another object of the present invention to provide an improved evaporation process for recovering fresh water from saline water.

Other objects of the present invention will in part be obvious and will in part appear hereinafter.

We have discovered that the evaporation rate of an aqueous solution heated by a solar radiant energy is remarkably increased when there is disposed on the surface of said aqueous solution a water-permeable coating comprising a polymer associated with finely-divided carbonaceous materials.

For the purposes of the present invention, the term "solar radiant energy" encompasses that form of energy characterized by the ability to pass through gases without substantial heating thereof while maintaining the ability to substantially heat solids and liquids. The bulk of the sun's radiant energy resides in electromagnetic radiation; hence, sources other than the sun which can supply said type and quality of radiation are also suitable. For instance, an energy source such as infra-red lamps, and the like produces radiational energy suitable for the purposes of the present invention.

Polymers suitable for the production of the water permeable coatings of the present invention generally include any water insoluble polymer which (1) has a melting point greater than the temperature to be encountered during operations and (2) will float or can be treated so as to float on or near the surface of the aqueous solution to be evaporated. Since the density of an aqueous solution is dependent upon the types and amounts of solutes present therein the particular polymers which will float thereon will vary depending upon the composition of a particular aqueous solution. Generally speaking, however, polymers which are less dense than pure water and thus normally possess sufficient buoyancy to float on the surface of aqueous solutions are polymers of α-mono- and di-olefinic hydrocarbons such as polyethylene, polybutadiene, polypropylene, polybutene, polystyrene, ethylene-propylene copolymers, and the like, and certain elastomeric polymers such as natural rubber or ethylene-propylene rubber.

It should be noted, however, that the density of many polymers is greater than that of pure water and thus said polymers are generally not sufficiently buoyant to float at or near the surface of an aqueous solution. Typical classes of such polymers are polyvinyl halides, polyphenolics, polyacetals, polyamides, polyepoxides, polyesters, polycarbonates, polyethers, etc. Such polymers can usually be treated, such as by foaming or "expanding" to yield cellular foams which foams frequently possess sufficient buoyancy. Specific examples of polymers that are suitable when treated by foaming are polyvinyl chloride, styrene-acrylonitrile copolymer, polyurethane, cellulose acetate, bisphenol-A/epichlorohydrin epoxy resins, polyvinyl isobutyl ether, polyvinylidene fluoride, polyvinyl chloride-acetate copolymer, polyvinyl butyral, polyethylene terephthalate, polyhexamethyleneadipamide, bisphenol A/phosgene polymers, polymethyl methacrylate and the like. It should be further noted that when so desired, those polymers which are normally suitable without special treatment for use in accordance with the present invention such as those mentioned hereinbefore, for example, polyethylene, can also be foamed and when foamed normally remain entirely suitable.

Many methods by which foaming of polymers is accomplished are well known and the particular method employed is normally not critical to the present invention. Examples of particular foaming methods, blowing agents, etc., can be found in such treatises as: A Concise Guide to Plastics, by Simonds and Church, 2nd Ed., 1963, Reinhold, pp. 108–113, and Plastics Engineering Handbook, Reinhold, 1960, pp. 136–197.

In general, foamed polymers conform to one of two well-known broad categories: open cell structure or closed cell structure. For the purposes of the present invention, foamed polymers comprising an open cell structure, i.e. foamed polymers wherein the cells are predominantly in open communication with neighboring cells and with the atmosphere, and in addition which are wettable and thus contribute to capillary activity, are much preferred.

In order that the polymer coating applied to the surface of the aqueous solution be permeable with respect to water vapor, it is important that the form and type of polymer utilized be taken into account. When for instance, the polymer and form thereof utilized is readily permeable to water vapor such as is the case when open celled polyurethane is utilized the coating can be applied as continuous sheet or blanket. However, when the polymer does not readily allow passage therethrough of water vapor, as will often be the case, said polymer must be granulated, shredded, comminuted or the like to particle diameters below about ½" and preferably below about ⅛", or otherwise treated so as to render the ultimately produced surface coating readily permeable to water vapor. Thus, substantially water impermeable polymers such as polyethylene or polypropylene must be applied in granular, powdered, shredded form or the like when in the solid or closed cell state.

Generally, any particulate carbonaceous material comprising above about 35 and preferably above about 60 wt. percent elemental carbon and which is available in average particle diameters below about five microns and preferably below about 0.5 micron is suitable for the production of the water permeable surface coatings of the present invention. Among some familiar natural forms of carbonaceous materials which are often suitable are: coal, coke, gas coke, anthracite, charcoal, etc. Said materials can be crushed, abraded or treated in any manner by which the particle size set forth hereinabove is achieved. Also suitable, however, and generally preferred because they are readily available in average particle diameters below about 0.5 micron are those forms of carbonaceous materials which are artificially produced and are generally referred to as carbon blacks such as channel black, oil furnace black, gas furnace black, thermal black, lamp black, acetylene black, and the like. Of the artificial forms mentioned above, the furnace blacks and particularly the oil furnace blacks are preferred.

It is important that the coating disposed at or near the surface to the solution to be exposed to solar radiation comprise carbonaceous material. Thus, the association of polymer and carbonaceous material can consist of a coating of said material on the polymer or a dispersion of the carbonaceous material in the polymer. Many methods for producing said coating or dispersion are suitable. For instance, it is well known to disperse a particulate solid into a polymeric resin such as polyethylene by milling the solid and resin together at temperatures sufficient to flux said resin. When polymer foams are to be utilized, dispersion of the carbonaceous material into the polymer should normally be accomplished prior to the foaming step. Another suitable method of producing a polymer having a carbonaceous material dispersed therein comprises polymerizing or cross linking a monomer(s) in the presence of the carbonaceous material. For instance, the carbonaceous material can be dispersed into a liquid polyester resin prior to the addition thereto of the hardening catalyst. Also, a polymer can be coated with a carbonaceous material by any suitable method including by slurrying said material in a suitable solvent for the polymer and thereafter treating the polymer with the solvent/carbonaceous material slurry.

The amount of carbonaceous material present in association with the polymer is subject to considerable variation. The minimum requirements are dictated by such parameters as: the type of carbonaceous material utilized, the extent of increase in evaporation rate desired, the physical form of the polymer coating to be applied to the liquid surface, the type of polymer utilized, the form in which the polymer and carbonaceous material are associated (coating or dispersion for example). When such parameters are taken into account, the amount of carbonaceous material required for any particular occasion can be readily determined. We have found for instance that in particulate low density polyethylene polymers, a dispersion comprising about 35% by weight of polymer of thermal black is generally sufficient. Normally, at least about 5% by weight of the polymer of hydrocarbonaceous material is preferred.

The thickness of the water permeable coating applied to the surface of the aqueous solution is generally not critical. Too thick a layer, however, tends to reduce the evaporation rate. However, sufficient amounts of said polymer coating should normally be utilized to substantially cover the surface. When a water-impermeable polymer in granular form is to be utilized, the average thickness of the surface layer is preferably below about 0.5 inch, and most preferably below about 0.25 inch.

It should be noted that in certain cases and particularly when large systems such as lakes, bays, inlets, etc., are involved, conditions such as tides, currents, winds, etc., can affect the extent of coverage of particulate or granulated coatings. For instance, high winds and wave action will tend to obviate complete coverage of the water surface. However, during relatively calm periods, or when the body of water is relatively protected, a coating in granulated form will generally tend to spread on the surface and thereby effect relatively complete coating of the water surface. In smaller systems, such as solar evaporators, the environment can generally be controlled to the extent that substantially complete coverage of the water surface is effected and maintained if desired.

There follows an illustrative non-limiting example:

EXAMPLE 1

To apparatus of the type illustrated in the attached drawing comprising glass tray 10 having the dimensions 24" x 12" x 16", there is charged sea water to a depth of about 8 inches. Next there is positiond over said tray, finely-etched glass enclosure 12 having troughs 14 positioned under lowermost edges 16 of platform 13 so as to collect condensed liquids running down the inner surfaces of the glass. Each of said troughs communicates with a common discharge duct which is positioned over a 1000 milliliter graduate maintained at about 68° F. The entire assembly hereinafter referred to as System I, the control is then exposed to direct sunlight. Simultaneously, there are placed in said sunlight two additional duplicate assemblies hereinafter referred to as System II and System III. In System II, however, there is substantially evenly disposed on the surface of the sea water about 3 grams of granulated foamed low density polyethylene particles having an average particle diameter of about 100 mesh while in System III there is dispersed on the surface of the sea water about 3 grams of the same foamed polyethylene utilized in System II having an average particle diameter of about 100 mesh and having dispersed therein about 45% by weight of thermal black. The amount of water collected from each of the systems is measured from time to time, the comparative results of which are shown in Table I below.

TABLE I

| Time (hrs.) | System I | Percent Difference in Amount of Water Collected as Compared to System I | |
|---|---|---|---|
| | | System II | System III |
| 4 | Control | −20 | +37 |
| 6 | Control | −15 | +45 |
| 22 | Control | −10 | +47 |
| 28 | Control | −10 | +48 |

Similar increases in the evaporation rate occur when epoxy resin foams loaded with carbon black are dispersed on the surface of the water in System III in place of the carbon black-loaded polyethylene utilized above.

The explanation of the effectiveness of the process of the present invention in increasing evaporation rates is not precisely known and thus there is no intent to be bound by the following explanation. However, it is believed that the presence of polymer coatings comprising carbonaceous materials on the surface of an aqueous system forms a "heat barrier" between the deeper portions of said system and the radiant energy which impinges on the surfaces thereof. Thus, the bulk of the heat transfer to the aqueous system occurs at and/or near the surface and is consequently more efficient for the purposes of evaporation. Moreover, the presence of the polymer may tend to increase the area over which heat transfer takes place at or near the surface. Finally, when wettable, open cell, foamed polymers are utilized there appears to be a further increase in evaporation rate probably due to capillary action.

Obviously, many changes can be made in the above example, description and accompanying drawing without departing from the scope of the present invention.

For instance, although only polymeric water-permeable coatings comprising oil furnace blacks are utilized in the above example, polymers comprising other carbonaceous materials having an elemental carbon content of above about 35 weight percent, such as finely-divided charcoal or thermal carbon black are also suitable.

Obviously, polymers other than polyethylene and epoxy resins which are specifically mentioned above are also suitable for the purposes of the present invention provided that said polymers are substantially water insoluble and can be rendered sufficiently buoyant to float on or near the surface of the aqueous solution to be treated. Thus, granular natural rubber, polyurethane, polymethyl methacrylate and the like are also suitable.

Moreover, although only saline water is utilized above, the benefits accruing from the process of the present invention are obviously also available when applied to fresh water. For instance, the coating of fresh water marshes and swamps with a polymer associated with a carbonaceous material in accordance with the present invention will result in increased rates of water evaporation therefrom.

Accordingly, it is intended that the above disclosure be regarded as illustrative and as in no way limiting the scope of the invention.

What we claim is:

1. A process for improving the evaporation rate of an aqueous solution which is exposed to solar radiant energy which comprises applying to the surface of said solution a water permeable coating comprising a polymeric material associated with a finely-divided carbonaceous material comprising above about 35% by weight elemental carbon and having an average particle diameter of less than about 5 microns.

2. The process of claim 1 wherein said finely-divided carbonaceous material has an average particle diameter of less than about 0.5 mircon.

3. The process of claim 1 wherein said finely-divided carbonaceous material is a carbon black chosen from the group consisting of thermal black, oil furnace black, gas furnace black, channel black and mixtures thereof.

4. The process of claim 1 wherein said finely-divided carbonaceous material is oil furnace black.

5. The process of claim 1 wherein said finely-divided carbonaceous material is thermal black.

6. The process of claim 1 wherein said polymeric material in substantially voidless form has a density less than that of said solution.

7. The process of claim 1 wherein said polymeric material is chosen from the group consisting of polymonoolefins, polydi-olefins and mixtures thereof.

8. The process of claim 1 wherein said polymeric material is polyethylene.

9. The process of claim 1 wherein said polymeric material is polystyrene.

10. The process of claim 1 wherein said polymeric material is foamed and the foam is reduced to particulate form prior to application thereof to the surface of said solution.

11. The process of claim 1 wherein said polymeric material comprising said coating has an open cell structure.

12. The process of claim 1 wherein the polymeric material and associated carbonaceous material are applied to said surface as a coating having a thickness of less than about 0.5 inch.

13. The process of claim 1 wherein the polymeric material and associated carbonaceous material are applied to said surface as a coating having a thickness of less than about 0.25 inch.

14. The process of claim 1 wherein said carbonaceous material is dispersed in said polymeric material.

15. The process of claim 1 wherein said polymeric material is coated with said carbonaceous material.

References Cited by the Examiner

UNITED STATES PATENTS

| | | | |
|---|---|---|---|
| 1,673,429 | 6/1928 | Vinson | 126—271 |
| 3,015,613 | 1/1962 | Edmondson | 202—234 X |
| 3,077,190 | 2/1963 | Allen | 126—271 |
| 3,138,546 | 6/1964 | Muller | 202—234 X |
| 3,194,228 | 7/1965 | Bargues | 126—271 |

FOREIGN PATENTS

| | | |
|---|---|---|
| 236,337 | 11/1961 | Australia. |
| 763,867 | 5/1934 | France. |
| 19,560 | 1914 | Great Britain. |

UNITED STATES PATENTS

U.S. Dept. of Interior, Office of Saline Water Research Development, Progress Report No. 31, pages 4–15, Progress Report No. 50, pages 33, 34, 80.

NORMAN YUDKOFF, *Primary Examiner.*

J. SOFER, *Assistant Examiner.*